(12) United States Patent
Eason

(10) Patent No.: US 6,386,055 B1
(45) Date of Patent: May 14, 2002

(54) SENSOR APPARATUS FOR TRANSMITTING ELECTRICAL PULSES FROM A SIGNAL LINE INTO AND OUT OF A VESSEL TO MEASURE A PROCESS VARIABLE—IN ORDER TO BE MORE INFORMATIVE

(75) Inventor: Donald V. Eason, Indianapolis, IN (US)

(73) Assignee: Endress +Hauser GmbH +Co., Maulburg (DE)

( * ) Notice: Subject to any disclaimer, the term of this patent is extended or adjusted under 35 U.S.C. 154(b) by 0 days.

(21) Appl. No.: 09/220,100

(22) Filed: Dec. 23, 1998

Related U.S. Application Data

(60) Provisional application No. 60/070,541, filed on Jan. 6, 1998.

(51) Int. Cl.$^7$ ............... G01D 21/00; G01F 23/22; G01F 23/28; G01S 13/00; G01S 13/02
(52) U.S. Cl. ............... 73/866.5; 73/290 R; 324/642; 324/644
(58) Field of Search ............... 73/866.5, 290 R, 73/304 R, 304 C; 324/642, 644

(56) References Cited

U.S. PATENT DOCUMENTS

| | | | |
|---|---|---|---|
| 2,955,466 A | 11/1960 | Coles ............... | 73/304 CR |
| 3,025,464 A | * 3/1962 | Bond ............... | 73/866.5 X |

(List continued on next page.)

FOREIGN PATENT DOCUMENTS

| | | | | |
|---|---|---|---|---|
| DE | 1 648 163 | 4/1970 | ............... | 73/304 C |
| DE | 27 44 864 | 4/1979 | ............... | 73/304 C |
| DE | 41 18 715 | 12/1992 | ............... | 73/304 C |
| DE | 44 04 745 | 8/1995 | ............... | G01F/23/28 |
| EP | 0 307 930 A2 | 3/1989 | ............... | G01F/23/22 |
| EP | 0 534 654 | 3/1993 | ............... | 73/290 R |
| EP | 0 780 664 A2 | 6/1997 | ............... | G01F/23/284 |
| GB | 2 064 128 | 6/1981 | ............... | 73/304 C |
| GB | 2 079 950 | 1/1982 | ............... | 73/304 C |
| WO | WO 93/24812 | 12/1993 | ............... | G01F/23/28 |

OTHER PUBLICATIONS

Derwent Abstract of SU 741151 B, Inventor Bazhenov et al, Acc–No. 1981–13136 D, Entitled Butter Water Content Electric Indicator has Two Concentric Dielectric Inserts Confg. Symmetrical Projections with Tropezoidal Section, Jun. 15, 1980.*

Primary Examiner—Thomas P. Noland
(74) Attorney, Agent, or Firm—Bose McKinney & Evans LLP

(57) ABSTRACT

A sensor apparatus (1) designed for industrial applications is provided for transmitting electrical pulses from a signal line (2) into and out of a vessel to measure a process variable, which has a low outer diameter, preferably of 1½" or lower, while providing high mechanical stability and maintaining a high degree of transmission efficiency. It comprises a mounting section (3) configured to be coupled to the vessel, at least two concentric at least partially overlapping dielectric inserts (6, 9, 10, 11, 17) stacked inside one another located inside the mounting section (3), the dielectric inserts (6, 9, 10, 11, 17) comprising central apertures, a conductive probe element (4) mounted inside the mounting section (3) and extending through the apertures of the dielectric inserts (6, 9, 10, 11, 17) into the vessel, an electrical connector (5) configured to couple the signal line (2) to the probe element (4), wherein an electric impedance inside the mounting section (3), is nearly constant and approximately equal to the electric impedance of the signal line (2).

25 Claims, 4 Drawing Sheets

U.S. PATENT DOCUMENTS

| | | | | |
|---|---|---|---|---|
| 3,339,411 A | | 9/1967 | Riffie | 73/304 C |
| 3,367,183 A | | 2/1968 | Webster | 73/304 C |
| 4,010,537 A | | 3/1977 | Oxenreider | 73/304 R |
| 4,301,681 A | | 11/1981 | Maltby et al. | 73/340 C |
| 4,408,822 A | | 10/1983 | Nikitas | 439/583 |
| 4,449,405 A | | 5/1984 | Franz et al. | 73/304 C |
| 4,465,088 A | | 8/1984 | Vosper | 73/304 R |
| 4,507,521 A | | 3/1985 | Goellner | 73/304 R |
| 4,944,861 A | | 7/1990 | Reber | 204/423 |
| 4,990,105 A | * | 2/1991 | Karlovich | 439/578 |
| 5,085,886 A | * | 2/1992 | Grandmougin | 725/143 |
| 5,123,864 A | * | 6/1992 | Karlovich | 439/585 |
| 5,172,717 A | * | 12/1992 | Boyle et al. | 137/155 |
| 5,272,921 A | | 12/1993 | Foller et al. | 73/304 R |
| 5,304,985 A | | 4/1994 | Cosser | 73/304 R |
| 5,305,237 A | | 4/1994 | Dalrymple et al. | 73/290 B |
| 5,339,861 A | | 8/1994 | Smith, III | 137/614.04 |
| 5,345,471 A | | 9/1994 | McEwan | 375/130 |
| 5,361,070 A | | 11/1994 | McEwan | 342/21 |
| 5,376,888 A | | 12/1994 | Hook | 324/663 |
| 5,391,839 A | | 2/1995 | Lang et al. | 73/304 C |
| 5,609,059 A | | 3/1997 | McEwan | 73/290 R |
| 5,661,251 A | | 8/1997 | Cummings et al. | 73/304 R |
| 5,669,263 A | | 9/1997 | Borchers et al. | 73/304 R |
| 5,727,421 A | * | 3/1998 | Murphy | 73/866.5 X |
| 5,739,441 A | | 4/1998 | Friese et al. | 73/866.5 |
| 5,827,985 A | | 10/1998 | Grieger et al. | 73/304 R |
| 5,926,080 A | * | 7/1999 | Polon et al. | 73/290 R |
| 5,955,684 A | | 9/1999 | Gravel et al. | 73/866.5 |
| 5,992,251 A | | 11/1999 | Grieger et al. | 73/866.5 |
| 6,019,007 A | | 2/2000 | Grieger et al. | 73/866.5 |
| 6,118,282 A | * | 9/2000 | Grieger | 73/866.5 |

* cited by examiner

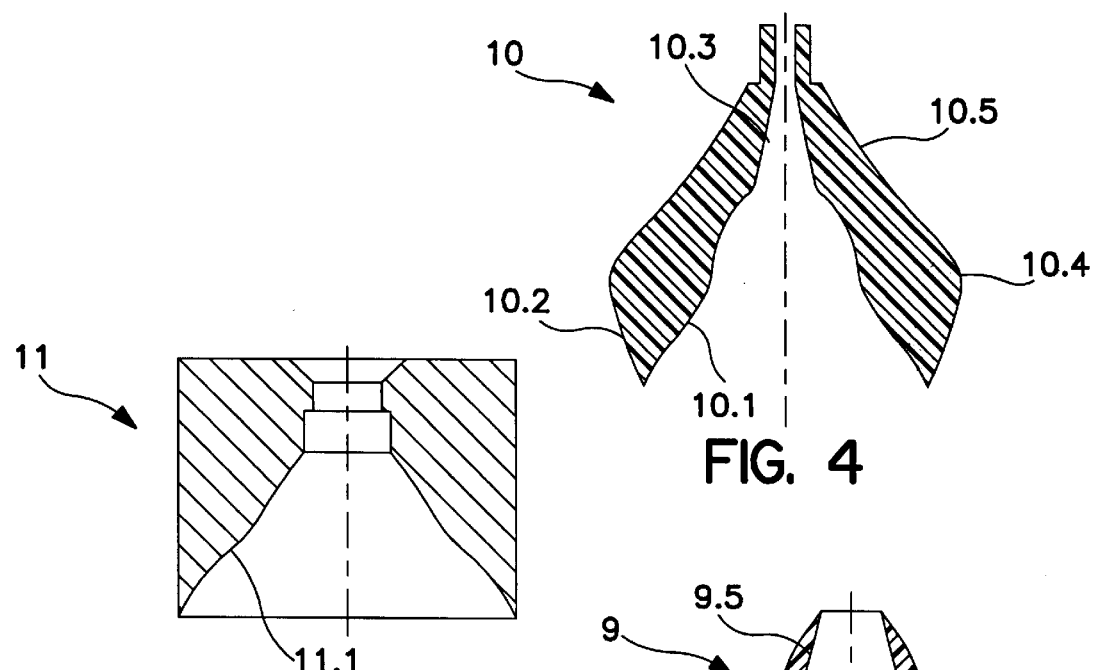
FIG. 4
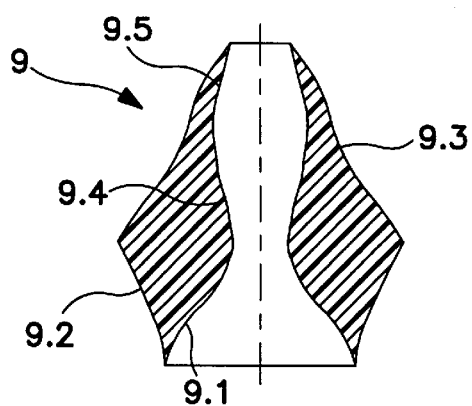
FIG. 2
FIG. 5
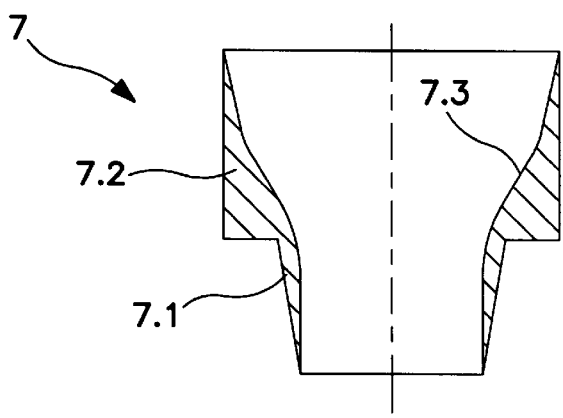
FIG. 3
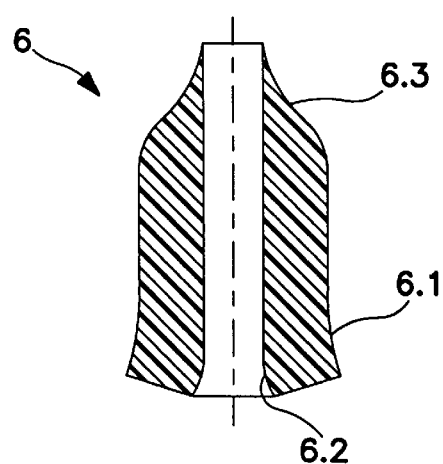
FIG. 6

SENSOR APPARATUS FOR TRANSMITTING ELECTRICAL PULSES FROM A SIGNAL LINE INTO AND OUT OF A VESSEL TO MEASURE A PROCESS VARIABLE— IN ORDER TO BE MORE INFORMATIVE

Cross Reference to Related Application

This application claims the benefit under 35 U.S.C. 119(e) of U.S. provisional application 60/070,541, filed Jan. 6, 1998.

BACKGROUND AND SUMMARY OF THE INVENTION

The present invention relates to a sensor apparatus for transmitting electrical pulses from a signal line into and out of a vessel to measure a process variable. A single conductor surface wave transmission line (Goubau line) is adapted as a sensor for industrial process variable measurement, in particular for level measurement. Such devices are intended for use for example in the process and storage industry.

A pulse sent down a probe is affected by any change of the electrical properties of the surroundings of the probe. A material located inside the vessel for example causes a change in electrical impedance at the material surface. At least part of the pulse will thus be reflected at the surface. The level of the material inside the vessel can be determined from the time required for the pulse to propagate to the surface and back.

Other process variables can be determined. The amplitude of a reflected pulse for example is a measure of the change in impedance at the reflecting surface and can be used to determine the dielectric constant of the material. Also it is feasible to measure thickness and/or dielectric constants of layers of different materials stored in a vessel from the amplitude and the time-of-flight of the respective number of reflected pulses. This is often referred to as interface measurement.

Recent developments by the National Laboratory System now make it possible to generate fast, low power pulses, and time their return with very inexpensive circuits. See, for example, U.S. Pat. No. 5,345,471 and U.S. Pat. No. 5,361,070 assigned to The Regent of the University of California. The pulses generated by this new technology are broadband, and also are not square wave pulses. In addition, the generated pulses have a very low power level. Such pulses are at a frequency of 100 MHz or higher and have an average power level of about 1 nano Watt or lower. These factors present new problems that must be overcome to transmit the pulse down and back and to process and interpret the returned pulses.

It is of essential importance to provide a design for the sensor apparatus which ensures a high mechanical stability suitable for industrial applications while at the same time maintaining the electrical operation of a Goubau line. This includes ensuring a smooth impedance transition of the pulse from the signal line and transmission through the mounting to the probe and vice versa. Changes in electrical impedance throughout the apparatus, i.e. the signal line, the mounting area and the probe inside and outside the mounting section are to be avoided. Electrical impedance discontinuities and/or geometric discontinuities cause a partial reflection of energy of the pulse and thus reduce the signal to noise ratio. This can result in disruption, dissipation and/or excitation of modes of propagation other than the ones originally excited.

In U.S. patent application Ser. No. 08/574,818 entitled SENSOR APPARATUS FOR PROCESS MEASURE-MENT filed on Dec. 19, 1995, and now U.S. Pat. No. 5,661,251, issued Aug. 26, 1997; and a related Continuation in Part Application U.S. patent application Ser. No. 08/735,736 with the same title filed on Oct. 23, 1996, now U.S. Pat. No. 5,827,985, issued Oct. 27, 1998, sensor apparati for transmitting electrical pulses from a signal line into and out of a vessel to measure a process variable are described.

A sensor apparatus is described comprising:
a mounting section configured to be coupled to the vessel
dielectric inserts located inside the mounting section, said dielectric inserts having central apertures,
a conductive probe element mounted inside the mounting section and extending through the apertures of the dielectric inserts into the vessel,
an electrical connector
configured to couple the signal line to the probe element,
wherein an electric impedance inside the mounting section, is nearly constant and approximately equal to the electric impedance of the signal line.

The dielectric inserts are discs, cylinders or cones comprising two ring-shaped flat surfaces and are piled one on top of the other. A metal insert comprising a thread is screwed onto the dielectric inserts into the mounting section in a direction towards the vessel. It prevents a movement of the dielectric inserts in a direction away from the vessel. It is also described, that the metal insert alternately may be snapped in and held with a spring element and a retaining ring.

The metal insert includes an air filled conical cavity. A corresponding conical internally threaded metal fastener, serving as an impedance transitioning element and as an intermediate connecting stuctural element, is located within the air filled cavity. A mechanically reciprocating high frequency electrical connector is coupled to an end of the conical fastener racing away from the vessel via a high frequency contact pin. This pin is affixed within an aperture of the cone. The reciprocating joint of the contact pin and the high frequency connector permits some axial movement of the probe element. If the position of the conical fastener with respect to the insert is altered, the impedance matching essential for a smooth impedance transition from the signal line to the probe is impaired. Also a movement of the pin within the connector may change the electric properties of the connector and thus affect the quality of the signal transition.

The dielectric constants of the inserts are selected to minimize impedance transitions encountered by the electrical signal passing from the connector through the contact pin and into the probe element.

Given a predetermined impedance of the signal line, typically 50 Ohms, recent studies of the applicant have shown, that by employing a design as described above using layers of dielectric elements piled one on top of the other, it is not possible to build sensor apparati having mounting sections with small outer diameters. Since materials available for dielectric inserts only cover a limited range of values of dielectric constants, the minimal outer diameter is set by the impedance of the signal line and the dielectric constant of the dielectric insert .

Theoretically it is possible to dramatically reduce the outer diameter, if the design were to include air or gas filled cavities rather than dielectric inserts made of solid dielectric material There is a limitation to this though because the dielectric inserts not only serve the purpose of impedance matching but also of securely affixing the probe element within the mounting section. Obviously air or gas filled cavities even though they may have the optimum dielectric constant, are not suitable for physically supporting the probe element.

It is an object of the invention to provide a sensor apparatus which can be used in industrial applications, which has a low outer diameter, preferably of 1½" or lower, while providing high mechanical stability and maintaining a high degree of transmission efficiency through the use of impedance and propagation mode controlling techniques.

To this end the invention comprises a sensor apparatus for transmitting electrical pulses from a signal line into and out of a vessel to measure a process variable, the sensor apparatus comprising:

a mounting section configured to be coupled to the vessel, at least two concentric at least partially overlapping dielectric inserts stacked inside one another located inside the mounting section, said dielectric inserts comprising central apertures, a conductive probe element mounted inside the mounting section and extending through the apertures of the dielectric inserts into the vessel, an electrical connector
configured to couple the signal line to the probe element, wherein an electric impedance inside the mounting section, is nearly constant and approximately equal to the electric impedance of the signal line.

According to a refinement of the invention each dielectric insert has one end facing towards the vessel and one end facing away from the vessel, and all ends located inside the mounting section have outer and inner surfaces, said surfaces being orientated such that the thickness of the insert decreases towards said ends, and inner and outer diameter of each dielectric insert inside the mounting section are constant or change gradually in a direction parallel to a longitudinal axis of the respective dielectric insert.

According to a refinement of the invention an outer diameter of the mounting section is equal to or smaller than 1½" and at least two of the dielectric inserts are made of different materials with different dielectric constants.

According to a refinement of the invention the dielectric inserts are made of thermo or thermoset plastic, elastomer, ceramic, polyetherimid (PEI), polytetrafluoroethylene (PTFE), polyphenylsulfide (PPS), or polycarbonate or are formed by air or gas filled cavities.

According to a refinement of the invention the dielectric inserts are clamped between a first and a second metallic insert, said first metallic insert being located near an end of the mounting section facing toward the vessel and said second metallic insert being located near an end of the mounting section facing away from the vessel.

According to a refinement of the invention the first metallic insert is pressed towards the second metallic insert by a first spring element and the second metallic insert is pressed towards the first metallic insert by a second spring element.

According to a refinement of the invention the electrical connector is attached to the second metallic insert and an external mechanical force will cause the dielectric and the metallic inserts and the electrical connector to perform incremental axial movements inside the mounting section as one integral unit.

According to a refinement of the invention an inner diameter of each metallic insert changes gradually in a direction parallel to a longitudinal axis of the respective metallic insert.

According to a refinement of the invention, the probe element comprises an downwardly tapered surface facing towards the vessel and engaging a downwardly tapered inner surface of an innermost dielectric insert preventing a movement of the probe element in a direction towards the vessel and an upwardly tapered surface facing away from the vessel and engaging an upwardly tapered inner surface of said innermost dielectric insert preventing a movement of the probe element in a direction away from the vessel.

According to a refinement of the invention an upwardly tapered inner surface of the mounting section located at the end of the mounting section facing towards the vessel engages an upwardly tapered outer surface of a first dielectric insert and an upwardly tapered inner surface of said first dielectric insert engages an upwardly tapered outer surface of the probe element located near the end of the mounting section facing towards the vessel.

According to a refinement of the invention, seals, in particular o-rings, are inserted near the end of the mounting section facing towards the vessel between the mounting section and the first metallic insert, and/or between a first dielectric insert and the first metallic insert, and/or between the probe element and the first dielectric insert surrounding it and wherein the seal between the mounting section and the first metallic insert forms a slidable seal.

According to a refinement of the invention the electrical connector is coupled to a contact pin element, said contact pin element being configured for affixation to the probe element.

According to a further refinement, the dielectric inserts are symmetric to a longitudinal axis of the sensor apparatus.

The invention and its advantages are explained in more detail using the figures of the drawing, in which two exemplary embodiments are shown The same reference numerals refer to the same elements throughout the figures.

BRIEF DESCRIPTION OF THE DRAWINGS

FIG. 2 shows a longitudinal section of a second metallic insert of FIG. 1;

FIG. 3 shows a longitudinal section of a first metallic insert of FIG. 1;

FIG. 4 shows a longitudinal section of a third dielectric insert of FIG. 1;

FIG. 5 shows a longitudinal section of a second dielectric insert of FIG. 1;

FIG. 6 shows a longitudinal section of a first dielectric insert of FIG. 1;

DETAILED DESCRIPTION OF THE DRAWINGS

Figure 1:
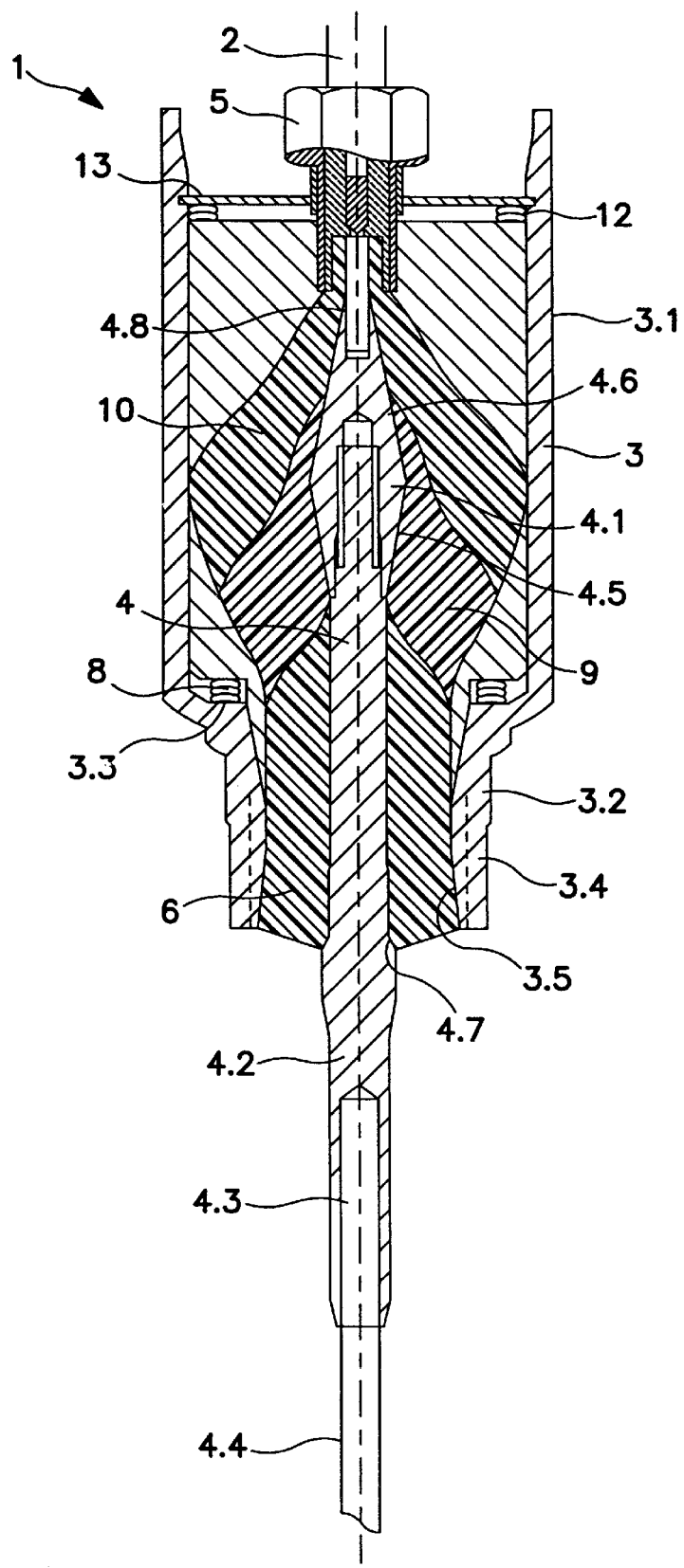
FIG. 1 shows a longitudinal section of a first embodiment of a sensor apparatus.

FIG. 1 shows a longitudinal section of a first embodiment of a sensor apparatus 1 according to the invention for transmitting electrical pulses from a signal line 2 into and out of a vessel to measure a process variable. The vessel is not shown. It could be a tank or a storage basin, a storage bin or any other type of container.

The sensor apparatus 1 comprises a mounting section 3 which is configured to be coupled to the vessel. It is essentially cylindrical comprising a first section 3.1 facing away from the vessel with a larger diameter and a second section 3.2 facing towards the vessel with a smaller diameter. Thus a shoulder 3.3 with a ring shaped surface facing away from the vessel exists between the first and the second section 3.1, 3.2. In the embodiment shown in FIG. 1 the mounting section 3 comprises a thread 3.4 located at the first section 3.1 of the mounting section 3 facing towards the vessel. It is designed to be screwed into a threaded opening located on the vessel. Other couplings for mounting a sensor apparatus 1 to a vessel, e.g. by welding the mounting section 3 to the vessel or by providing the mounting section 3 with a flange to be screwed onto a flange on the vessel, are also possible.

The mounting section 3 has a central aperture extending through the same which is filled by a number of different inserts. Every insert comprises a central aperture and a conductive probe element 4 is mounted inside the mounting section 3 and extends through the apertures of the inserts into the vessel. An electrical connector 5 is configured to couple the signal line 2 to the probe element 4.

The probe element 4 consists of metal, preferably of stainless steel, which provides for high mechanical strength. It includes a head portion 4.1 and an elongated conductive portion 4.2 extending away from the head portion 4.1 into the vessel. The head portion 4.1 comprises a threaded bore and the elongated conductive portion 4.2 is screwed into the bore.

The head portion 4.1 of the probe element 4 comprises a downwardly tapered surface 4.5 facing towards the vessel and an upwardly tapered surface 4.6 facing away from the vessel.

For the scope of this application the term downwardly tapered surface shall mean a surface defining a cone which has one end with a small diameter and another end with a larger diameter and the end with the larger diameter is facing away from the vessel. Accordingly the term upwardly tapered surface shall mean a surface defining a cone which has one end with a small diameter and another end with a larger diameter and the end with the larger diameter is facing toward the vessel.

The elongated portion 4.2 may extend further into the vessel forming a single rigid rod element or it may comprise a solid or a flexible probe extension, in particular a rod, a wire-rope or a wire. In the embodiment shown in FIG. 1, the elongated portion of the probe element 4.2 has a hollow section 4.3 facing toward the vessel and a flexible probe extension 4.4, is mounted inside the hollow section 4.3. It is fastened inside the hollow section 4.3 for example by swaging or by one or more set screws. To keep the flexible extension 4.4 taught and straight, it is either to be fixed to the bottom of the vessel, or a weight is to be connected to the free end of the flexible extension 4.4.

In the following the inserts will be described in the order given by their location inside the mounting section 3 beginning with the insert located at the end of the mounting section 3 facing towards the vessel and ending with the insert located at the end of the mounting section 3 facing away from the vessel. The consecutive order in which the parts are to be assembled may be different and will be described in the subsequent text.

A first dielectric insert 6 is located near the end of the mounting section 3 facing towards the vessel. FIG. 6 shows a longitudinal section of the first dielectric insert 6. It comprises an upwardly tapered outer surface 6.1 engaging an upwardly tapered inner surface 3.5 of the mounting section 3. The probe element 4 extends through a central aperture of the first dielectric insert 6. It comprises an upwardly tapered outer surface 4.7 located near the end of the mounting section 3 facing towards the vessel and abutting on an upwardly tapered inner surface 6.2 of the first dielectric insert 6.

The first dielectric insert 6 forms a pressure tight seal closing the side of the mounting section 3 facing towards the vessel. An increase in pressure inside the vessel will force the first dielectric insert towards the mounting section 3 thus enhancing the quality of the seal.

The first dielectric insert 6 consists of a dielectric material, preferably of Polytetrafluoroethylene (PTFE), which ensures a high chemical resistivity while at the same time providing good sealing properties.

The end of the first dielectric insert 6 facing away from the vessel comprises an upwardly tapered outer surface 6.3 and a cylindrical inner surface engaging the probe element 4. The upwardly tapered surface 6.3 is orientated such that the thickness of the first dielectric insert 6 decreases towards the end facing away from the vessel. Near this end the inner diameter of the first dielectric insert 6 is constant and engages the probe element 4. The outer diameter of the first dielectric insert 6 changes gradually in a direction parallel to a longitudinal axis of the first dielectric insert 6.

Adjacent to the first dielectric insert 6 a first metallic insert 7 is located inside the mounting section 3. A longitudinal section thereof is shown in FIG. 3. It comprises a first section 7.1 with an outer diameter equal to the inner diameter of the second section 3.2 of the mounting section 3 facing towards the vessel and a second section 7.2 with an outer diameter equal to the inner diameter of the first section 3.1 of the mounting section 3 facing away from the vessel. Between the first and the second section 7.1, 7.2 a shoulder exists which abuts on a ring-shaped first spring element 8 which is located on the shoulder 3.3 of the mounting section 3.

The thickness of the first section 7.1 gradually decreases in a direction towards the vessel and the thickness of the second section 7.2 gradually decreases in a direction away from the vessel forming an inner downwardly tapered surface 7.3. The inner diameters of the first and the second section 7.1, 7.2 of the first metallic insert 7 change gradually in a direction parallel to a longitudinal axis of the apparatus.

The first section 7.1 of the first metallic insert 7 completely fills a nearly cylindrical gap between the mounting section 3 and the first dielectric insert 6.

A second dielectric insert 9 is located above the first dielectric insert 6. FIG. 5 shows a longitudinal section of the second dielectric insert 9. It has one end facing towards the vessel and one end facing away from the vessel and its outer and inner surfaces are orientated such that the thickness of the insert decreases towards said ends. The inner and outer diameter of this second dielectric insert 9 inside the mounting section 3 change gradually in a direction parallel to a longitudinal axis of the second dielectric insert 9. On its end facing towards the vessel, the second dielectric insert 9 comprises an inner upwardly tapered surface 9.1 engaging the outer upwardly tapered surface 6.3 of the first dielectric insert 6 and an outer downwardly tapered surface 9.2 engaging the inner downwardly tapered surface 7.3 of the first metallic insert 7.

The first and the second dielectric insert 6, 9 are concentric. They are stacked inside one another and overlap partially. They are superposed and a contiguous boundery exists between them.

On the end facing away from the vessel, the second dielectric insert 9 comprises an upwardly tapered outer surface 9.3.

The probe element 4 extends through a central aperture of the second dielectric insert 9 and most of its head portion 4.1 is located inside the second dielectric insert 9. It is supported by a downwardly tapered inner surface 9.4 of the second dielectric insert 9 engaging the downwardly tapered outer surface 4.5 of the head portion 4.1 and by an upwardly tapered inner surface 9.5 of the second dielectric insert 9 engaging part of the upwardly tapered surface 4.6 of the head portion 4.1 located adjacent the downwardly tapered surface 4.5. The second dielectric insert 9 forms an innermost dielectric insert.

The probe element 4 is held in place inside the mounting section 3 by the downwardly tapered surface 4.5 of the probe element 4 facing towards the vessel and engaging the downwardly tapered inner surface 9.4 of the innermost second dielectric insert 9 preventing a movement of the probe element 4 in a direction towards the vessel and by the upwardly tapered surface 4.6 of the head 4.1 of the probe element 4 facing away from the vessel and engaging the upwardly tapered inner surface 9.5 of said innermost second dielectric insert 9 preventing a movement of the probe element 4 in a direction away from the vessel.

A third dielectric insert 10 is located above the second dielectric insert 9. FIG. 4 shows a longitudinal section of the third dielectric insert 10. It has one end facing towards the vessel and one end facing away from the vessel and its outer and inner surfaces are orientated such that the thickness of the insert decreases towards said ends. The inner and outer diameter of this third dielectric insert 10 inside the mounting section 3 change gradually in a direction parallel to a longitudinal axis of the third dielectric insert 10. On its end facing towards the vessel, the third dielectric insert 10 comprises an inner upwardly tapered surface 10.1 engaging the outer upwardly tapered surface 9.3 of the second dielectric insert 9 and an outer downwardly tapered surface 10.2 engaging the inner downwardly tapered surface 7.3 of the first metallic insert 7 Adjacent the downwardly tapered surface 10.2 on the side facing away from the vessel the third dielectric insert 10 comprises a cylindrical outer surface 10.4 engaged by the cylindrical inner surface of the first section 3.1 of the mounting section 3. Above this cylindrical section the third dielectric insert 10 has an upwardly tapered outer surface 10.5 extending from the inner surface of the mounting section 3 up to the electrical connector 5, which is connected to the end of the probe element 4 facing away from the vessel.

The third dielectric insert 10 also comprises an inner upwardly tapered surface 10.3 engaging the part of the upwardly tapered surface 4.6 of the head portion 4.1 of the probe element 4 not engaged by the inner upwardly tapered surface 9.5 of the second dielectric insert 9.

The second and the third dielectric inserts 9, 10 are concentric. They are stacked inside one another and overlap partially.

Above the third dielectric insert 10 on the side facing away from the vessel, a second metallic insert 11 is located inside the mounting section 3. FIG. 2 shows a longitudinal section of the second metallic insert 11. It has an outer diameter equal to the inner diameter of the first section 3.1 of the mounting section 3 and an inner upwardly tapered surface 11.1 extending from the inner surface of the mounting section 3 to a central aperture located on the side of the second metallic insert 11 facing away from the vessel. The inner diameter of the second metallic insert 11 changes gradually in a direction parallel to a longitudinal axis of the second metallic insert 11. The inner upwardly tapered surface 11.1 engages the outer upwardly tapered surface 10.5 of the third dielectric insert 10. The electrical connector 5 is mounted inside the central aperture of the second metallic insert 11.

On the end facing away from the vessel, the second metallic insert 11 has a flat surface and a ring-shaped second spring element 12 is placed on an outer ring of that flat surface.

The second spring element 12 is pressed against the second metallic insert 11 by a retainer ring 13 inserted in a groove inside the mounting section 3.

Thus the second and the third dielectric insert 9 and 10 are clamped between the first and the second metallic insert 7, 11, the first metallic insert 7 being located near a lower end of the mounting section 3 close to the vessel and the second metallic insert 11 being located near an upper end of the mounting section 3 away from the vessel. Since the first metallic insert 7 is pressed toward the second metallic insert 11 by the first spring element 8 and vice versa the second metallic insert 11 is pressed toward the first metallic insert 7 by the second spring element 12 and because the electrical connector 5 is mounted to the second metallic insert 11 these parts form one integral unit. An external mechanical force may cause incremental axial movements of the integral unit as a whole, it cannot however cause a movement of these elements with respect to each ocher.

During assembly the first dielectric insert 6 is inserted in the mounting section 3 from the side facing toward the vessel. The spring element 8 is slid over the first section 7.1 of the first metallic insert 7 and first metallic insert 7 and spring element 8 are inserted in the mounting section 3 from the side facing away from the vessel.

In a next step the second dielectric insert 9 is mounted on the head portion 4.1 of the probe element 4. The second dielectric insert 9 can be one single element molded onto the head portion 4.1. It is also possible for the second dielectric insert 9 to consists of two separate parts, one of them designed to be slid onto the head portion 4.1 from the side facing towards the vessel the other to be slid onto the head portion 4.1 from the side facing away from the vessel. The second dielectric insert 9 including the head portion 4.1 is inserted in the mounting section 3 from the side facing away from the vessel. Afterwards the third dielectric insert 10 and the metallic insert 11 are inserted and finally the second spring element 12 is placed on the second metallic insert 11. The spring element 12 is compressed by insertion of the retainer ring 13. Then the elongated portion 42 of the probe element 4 is screwed into the head portion 4.1 and the electrical connector 5 is mounted.

The connector 5 comprises an inner conductor surrounded by an insulating material. The inner conductor and the insulating material are positioned inside a metallic sleeve. One side of the connector 5 facing away from the vessel is designed to be coupled to the signal line. Since high frequency pulses are to be transmitted the signal line 2 is preferably a coaxial cable. The inner conductor of the coaxial line is connected to the inner conductor of the connector 5 and the outer conductor of the coaxial line is connected to the metallic sleeve of the connector 5.

The metallic sleeve can either be irreleasably fixed to the second metallic insert 11, e.g. welded to it, or it can be fastened to it by a snap fit connection. FIG. 1 shows one embodiment of a snap fit connection. The central aperture of the metallic insert 11 comprises a section with slightly enlarged inner diameter and the outer diameter of one end of the metallic sleeve facing toward the vessel can be slightly reduced. The later is accomplished e.g. by cuts extending in axial direction inserted through that end of the metallic sleeve.

In order to facilitate the mounting of the connector 5, the second metallic insert 11 comprises a downwardly tapered inner surface located near the end of the metallic insert 11 facing away from the vessel. Thus the connector 5 is centered and slightly compressed when pushed into the metallic insert 11. An end-section of the connector 5 located inside the section with enlarged inner diameter will slightly expand in diameter and thus hold the connector 5 inside the second metallic insert 11. An incremental movement of the metallic insert 11 in axial direction will cause an identical incremental movement of the connector 5.

One end of the inner conductor of the connector 5 is coupled to a contact pin element, said contact pin element being configured for affixation to the probe element 4. The probe 4 comprises a hollow cylinder 4.8 located adjacent the head portion 4.1 and extending in a direction away from the vessel toward the connector 5. A cylindrical recess is located within the head portion 4.1 of the probe element 4. The contact pin element extends through the hollow cylinder 4.8 and the recess forms a backing support for it. The contact pin element and the hollow cylinder 4.8 are surrounded by dielectric material.

One advantage of this design is, that the signal line is coupled directly to the probe element 4. No further impedance transition elements or intermediate connecting elements, e.g. conical fasteners, are needed. Energy losses occurring at impedance transition are reduced, since less impedance transitions are necessary. Also less parts are necessary and assembly of the sensor apparatus is simplified. The electrical connection is accomplished by mounting the second metallic insert 11 and by plugging the connector 5 into the second metallic insert 11.

Figure 7:
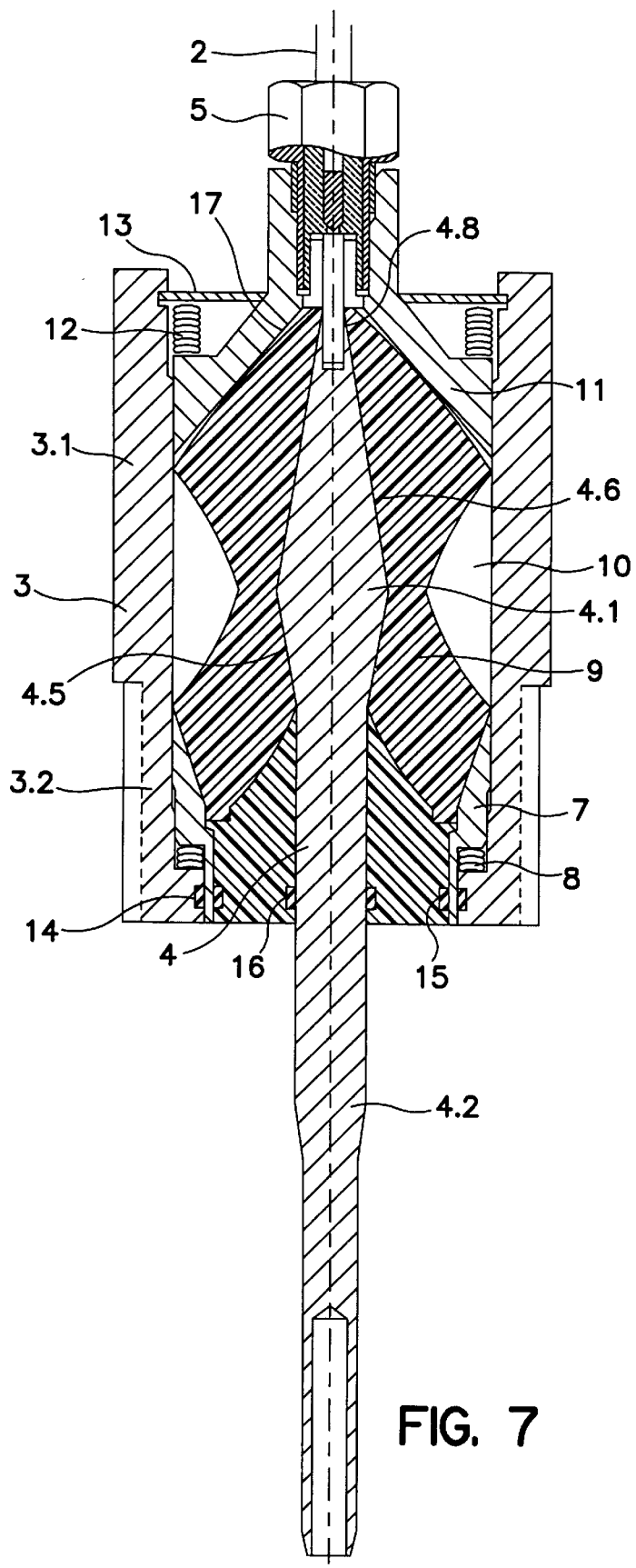
FIG. 7 shows a longitudinal section of a second embodiment of a sensor apparatus.

FIG. 7 shows a longitudinal section of a second embodiment of a sensor apparatus 1. It comprises a mounting section 3 with a first and a second section 3.1, 3.2. The second section 3.2 is configured to be coupled to the vessel and a conductive probe element 4 comprising a head portion 4.1 and an elongated portion 4.2 is mounted inside the mounting section 3. An electrical connector 5 is configured to couple the signal line 2 to the probe element 4.

At least two concentric at least partially overlapping dielectric inserts are stacked inside one another and are located inside the mounting section 3. They all comprise central apertures and the probe element 4 extends through the apertures of the dielectric inserts into the vessel. Electric impedance inside the mounting section 3, is nearly constant and approximately equal to the electric impedance of the signal line 2.

The dielectric inserts are clamped between a first and a second metallic insert 7, 11. The first metallic insert 7 is located near a lower end of the mounting section 3 facing toward the vessel and the second metallic insert 11 is located near an upper end of the mounting section 3 facing away from the vessel.

Figure 9:
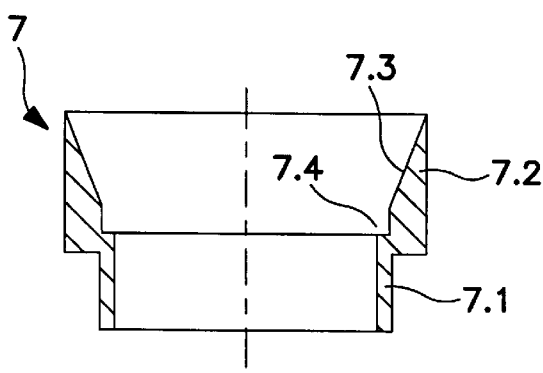
FIG. 9 shows a longitudinal section of a first metallic insert of FIG. 2.

The metallic inserts 7, 11 have basically the same shape as those shown in FIG. 1. The inner diameters of each metallic insert 7, 11 change gradually in a direction parallel to a longitudinal axis of the respective metallic insert 7, 11. A longitudinal section of the first metallic insert 7 is shown in FIG. 9. It comprises a first section 7.1 facing toward the vessel and a second section 7.2 facing away from the vessel. The first section 7.1 has the shape of a hollow cylinder. The second section 7.2 has a cylindrical outer surface and an outer diameter which is larger than the outer diameter of the first section 7.1. Its inner surface is downwardly tapered so that the thickness of the second section 7.2 decreases gradually in a direction away from the vessel.

As already described with respect to the embodiment according to FIG. 1, in the embodiment shown in FIG. 2 the first metallic insert 7 is pressed towards the second metallic insert 11 by a first spring element 8 and the second metallic 11 insert is pressed towards the first metallic insert 7 by a second spring element 12. The second spring element 12 is held in place by a retainer ring 13.

Again, the electrical connector 5 is attached to the second metallic insert 11 and an external mechanical force will cause the dielectric and the metallic inserts and the electrical connector 5 to perform incremental axial movements inside the mounting section 3 as one integral unit.

Figure 11:
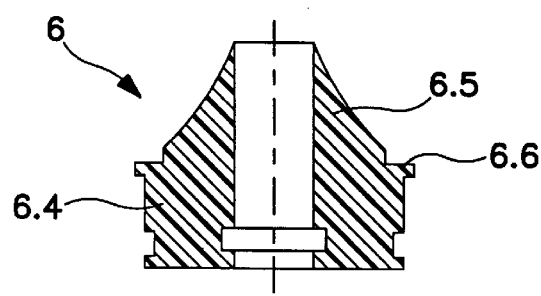
FIG. 11 shows a longitudinal section of a first dielectric insert of FIG. 2.

Each dielectric insert has one end facing towards the vessel and one end facing away from the vessel. All ends located inside the mounting section 3 have outer and inner surfaces said surfaces being orientated such that the thickness of the insert decreases towards said ends. Inner and outer diameter of each dielectric insert inside the mounting section are constant or change gradually in a direction parallel to a longitudinal axis of the respective dielectric insert, The first dielectric insert 6 is nominally flush mounted inside the mounting section 3 and faces toward the vessel. A longitudinal section of it is shown in FIG. 11. It comprises a cylindrical section 6.4 and a conical section 6.5. The cylindrical section fills a cylindrical cavity formed between the probe element 4 and a cylindrical inner surface of the first section 7.1 of the first metallic insert 7. The conical section 6.5 has an upwardly tapered outer surface facing away from the vessel and a cylindrical inner surface engaging the probe element 4.

Between the cylindrical section 6.4 and the conical section 6.5 the first dielectric insert 6 comprises a rim 6.6 which extends radially outward. This rim 6.6 abuts on a shoulder 7.4 which exists between the first and the second section 7.1 and 72 of the first metallic insert 7.

Figure 10:
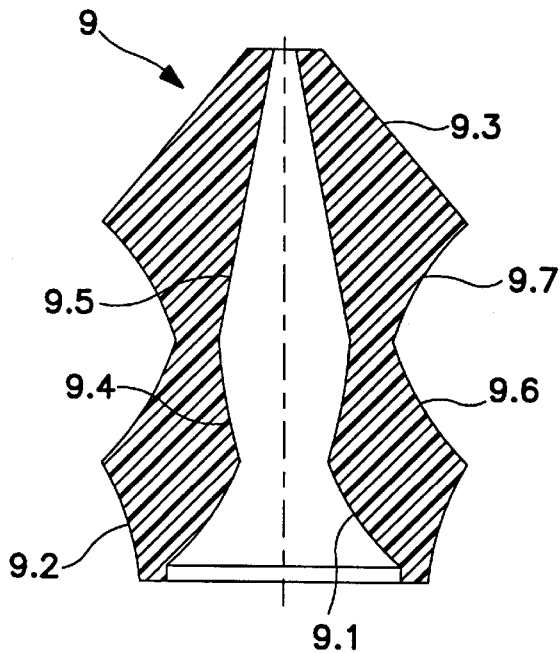
FIG. 10 shows a longitudinal section of a second dielectric insert of FIG. 2.

Inside the mounting section 3 the probe element 4 is supported by an innermost dielectric insert, the second dielectric insert 9, comprising an inner upwardly tapered surface 9.5 and an inner downwardly tapered surface 9.4. FIG. 10 shows a longitudinal section of the second dielectric insert 9. The probe element 4 comprises a head portion 4.1 with a downwardly tapered surface 4.5 facing towards the vessel and engaging the downwardly tapered inner surface 9.4 of the second dielectric insert 9 preventing a movement of the probe element 4 in a direction towards the vessel and an upwardly tapered surface 4.6 facing away from the vessel and engaging an upwardly tapered inner surface 9.5 of the second dielectric 9 insert preventing a movement of the probe element 4 in a direction away from the vessel.

The second dielectric insert 9 can be seen as consisting of four sections. A first section facing toward the vessel has an outer downwardly tapered surface 9.2 abutting on the inner downwardly tapered surface 7.3 of the second section 7.2 of the first metallic insert 7. Its inner surface 9.1 is upwardly tapered and engages the upwardly tapered surface of the first dielectric insert 6. The end of the second dielectric insert 9 facing towards the vessel abuts on the rim 6.6 of the first dielectric insert 6.

A second section adjoining the first section in a direction facing away from the vessel has an outer upwardly tapered surface 9.6 and the inner downwardly tapered surface 9.4. The inner surface engages the downwardly tapered surface of the head portion 4.1 of the probe element 4.

A third section adjoins the second section in a direction facing away from the vessel and has an outer downwardly tapered surface 9.7 and the inner upwardly tapered surface 9.5. The inner surface 9.5 engages the upwardly tapered surface 4.6 of the head portion 4.1 of the probe element 4.

The outer surfaces 9.6, 9.7 of the second and the third portion of the second dielectric insert 9 and the cylindrical inner surface of the second section 3.2 of the mounting section 3 define an air filled cavity, which serves as a third dielectric insert 10.

A fourth section adjoins the third section of the second dielectric insert 9 in a direction facing away from the vessel, It has an outer upwardly tapered surface 9.3 and the inner upwardly tapered surface 9.5. The inner surface 9.5 engages the upwardly tapered surface 4.6 of the head portion 4.1 of the probe element 4.

Figure 8:
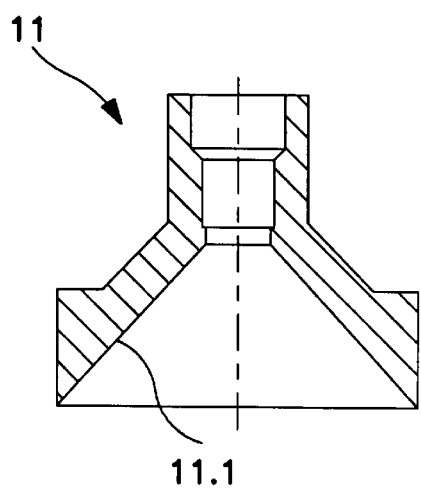
FIG. 8 shows a longitudinal section of a second metallic insert of FIG. 2.

FIG. 8 shows a longitudinal section of the second metallic insert 11. It has an inner upwardly tapered surface 11.1 which engages a part of the outer surface 9.3 of the fourth section facing toward the vessel Between the remainder of the outer surface 9.3 of the fourth section and the second metallic insert 11 a second airfilled cavity exists forming a fourth dielectric insert 17.

A first seal 14, in particular an O-Ring, is provided between the mounting section 3 and the first section 7.1 of the first metallic element 7. It is positioned within a ring-shaped groove located on the inner cylindrical surface of the second section 3.2 of the mounting section, near the end facing toward the vessel.

A second seal 15, in particular an O-Ring, is provided between the first section 7.1 of the first metallic element 7 and the cylindrical section of the first dielectric insert 6. It is positioned within a ring-shaped groove located on the outer cylindrical surface of the first dielectric insert 6, near the end facing toward the vessel.

A third seal 16, in particular an O-Ring, is provided between the probe element 4 and the cylindrical section 6.4 of the first dielectric insert 6. It is positioned within a ring-shaped groove located on the inner cylindrical surface of the cylindrical section 6.4 of the first dielectric insert 6.

The first, the second and the third dielectric insert 6, 9 and 10 are clamped between the first and the second metallic insert 7, 11, the first metallic insert 7 being located near a lower end of the mounting section 3 close to the vessel and the second metallic insert 11 being located near an upper end of the mounting section 3 away from the vessel. Since the first metallic insert 7 is pressed toward the second metallic insert 11 by the first spring element 8 and vice versa the second metallic insert 11 is pressed toward the first metallic insert 7 by the second spring element 12 and because the electrical connector 5 is mounted to the second metallic insert 11 these parts form one integral unit. An external mechanical force may cause incremental axial movements of the integral unit as a whole, it cannot however cause a movement of these elements with respect to each other.

The seal 14 forms a slidable seal. Apart from the groove for the seal 14 the inner surface of the mounting section 3 and the outer surface of the first metallic insert 7 in the vicinity of the seal 14 are cylindrical and the design of these elements allows a movement of the integral unit as a whole in a direction parallel to the longitudinal axis of the apparatus. This is a very advantageous design in applications where the probe element 4 may be exposed to high pulling forces, especially impulse forces.

During assembly the first seal 14 is inserted in the groove in the mounting section 3. The spring element 8 is slid over the first section 7.1 of the first metallic insert 7 and first metallic insert 7 and spring element 8 are inserted in the mounting section 3 from the side facing away from the vessel. The first dielectric insert 6 is provided with the second and the third seal 15, 16 and then inserted into the mounting section 3 from the side facing toward the vessel.

In a next step the second dielectric insert 9 is mounted on the head portion 4.1 of the probe element 4. The second dielectric insert 9 can be one single element molded onto the head portion 4.1. It is also possible for the second dielectric insert 9 to consists of two separate halves, one of them designed to be slid onto the head portion 4.1 from the side facing towards the vessel the other to be slid onto the head portion 4.1 from the side facing away from the vessel. The second dielectric insert 9 including the head portion 4.1 is inserted in the mounting section 3 from the side facing away from the vessel. The probe element 4 comprising the head portion 4.1 and the elongated portion 4.2 as shown in FIG. 2 is one single element. It is also possible to use a probe element as shown in the embodiment in FIG. 1 where the elongated portion 4.2 is screwed into the head portion 4.1. In a next step the second metallic insert 11 is inserted and the second spring element 12 is placed on the second metallic insert 11. The spring element 12 is compressed by insertion of the retainer ring 13. Finally the electrical connector 5 is mounted. The connector 5 shown in the embodiment in FIG. 2 is the same as the one shown in FIG. 1 and is mounted the same way.

In the embodiment shown in FIG. 1 the first dielectric insert 6 consists of polytetrafluoroethylene (PTFE), the second dielectric insert 9 consists of polyphenylsulfide (PPS) and the third dielectric insert 10 consists of polytetrafluoroethylene (PTFE).

In the embodiment shown in FIG. 2 the first dielectric insert 6 consists of polytetrafluoroethylene (PTFE), the second dielectric insert 9 consists of polycarbonate and the third and the fourth dielectric inserts 10, 16 consist of air.

Depending on the shape of the dielectric inserts other materials, thermo or thermoset plastic, elastomer, ceramic, polyetherimid (PEI), polytetrafluoroethylene (PTFE), polyphenylsulfide (PPS), or polycarbonate can also be used. Dielectric inserts which are not needed for mechanical support of the probe element 4 can be formed by air or gas filled cavities.

The materials are selected according to their dielectric constants as well as their mechanical properties such that an electric impedance inside the mounting section 3, is nearly constant and approximately equal to the electric impedance of the signal line 2 and that the apparatus can withstand high mechanical forces as they occur in industrial applications. Since at least two concentric at least partially overlapping dielectric inserts are stacked inside one another, the material of the innermost insert can be chosen according to its mechanical properties to ensure secure mounting of the probe element 4. The materials of the surrounding dielectric inserts are determined according to their dielectric properties such that the effective dielectric constant of each cross section has the predetermined value.

In both embodiments, the dielectric inserts 6, 9, 10, 11, 17 and the metallic inserts 7, 11 are symmetric to a longitudinal axis of the sensor apparatus.

What is claimed is:

1. A sensor apparatus (1) for transmitting electrical pulses from a signal line (2) into and out of a vessel to measure a process variable, the sensor apparatus (1) comprising:
    a mounting section (3) for coupling the sensor apparatus to the vessel,
    at least two concentric at least partially overlapping dielectric inserts (6, 9, 10, 11, 17) stacked inside one another and located inside the mounting section (3),
        said dielectric inserts (6, 9, 10, 11, 17) comprising central apertures,
    a conductive probe element (4) mounted inside the mounting section (3) and extending through the apertures of the dielectric inserts (6, 9, 10, 11, 17) into the vessel,
    an electrical connector (5)
        configured for coupling the signal line (2) to the probe element (4),
    wherein an electric impedance inside the mounting section (3), is nearly constant and approximately equal to the electric impedance of the signal line (2), each dielectric insert (6, 9, 10, 11, 17) has one end facing towards the vessel and one end facing away from the vessel, all ends located inside the mounting section (3) have outer and inner surfaces, said surfaces being oriented such that the thickness of the insert decreases towards said ends, and the inner and outer diameters of each dielectric insert inside the mounting section (3) are at least one of constant and change gradually in a direction parallel to a longitudinal axis of the respective dielectric insert (6, 9, 10, 11, 17).

2. A sensor apparatus according to claim 1, wherein an outer diameter of the mounting section is equal to or smaller than 1½" and at least two of the dielectric inserts (6, 9, 10, 11, 17) are made of different materials with different dielectric constants.

3. A sensor apparatus according to claim 2, wherein the dielectric inserts (6, 9, 10, 11, 17) are made of at least one of thermoplastic, thermoset plastic, elastomer, ceramic, polyetherimid (PEI), polytetrafluoroethylene (PTFE), polyphenylsulfide (PPS), and polycarbonate.

4. A sensor apparatus according to claim 3, wherein the dielectric inserts are clamped between a first and a second metallic insert (7, 11), said first metallic insert (7) being located near an end of the mounting section (3) facing toward the vessel and said second metallic insert (11) being located near an end of the mounting section (3) facing away from the vessel.

5. A sensor apparatus according to claim 4, wherein the first metallic insert (7) is pressed towards the second metallic (11) insert by a first spring element (8) and wherein the second metallic insert (11) is pressed towards the first metallic insert (7) by a second spring element (12).

6. A sensor apparatus according to claim 5, wherein the electrical connector (5) is attached to the second metallic insert (11) and wherein an external mechanical force will cause the dielectric and the metallic inserts (6, 7, 9, 10, 11, 17) and the electrical connector (5) to perform incremental axial movements inside the mounting section (3) as one integral unit.

7. A sensor apparatus according to claims 4, wherein the electrical connector (5) is attached to the second metallic insert (11) and wherein an external mechanical force will cause the dielectric and the metallic inserts (6, 7, 9, 10, 11, 17) and the electrical connector (5) to perform incremental axial movements inside the mounting section (3) as one integral unit.

8. A sensor apparatus according to claim 3, further comprising metallic inserts, wherein an inner diameter of each metallic insert (7, 11) changes gradually in a direction parallel to a longitudinal axis of the respective metallic insert (7, 11).

9. The sensor apparatus according to claim 3, wherein the dielectric inserts are formed by gas filled cavities.

10. The sensor apparatus according to claim 3, wherein the dielectric inserts are formed by air.

11. A sensor apparatus according to claim 1, wherein the probe element (4) comprises
    a downwardly tapered surface (4.5) facing towards the vessel and engaging a downwardly tapered inner surface (9.4) of an innermost dielectric insert (9) preventing a movement of the probe element (4) in a direction towards the vessel and
    an upwardly tapered surface (4.6) facing away from the vessel and engaging an upwardly tapered inner surface (9.5) of said innermost dielectric insert (9) preventing a movement of the probe element (4) in a direction away from the vessel.

12. A sensor apparatus according to claim 11, wherein an upwardly tapered inner surface (3.5) of the mounting section (3) located at the end of the mounting section (3) facing towards the vessel engages an upwardly tapered outer surface (6.1) of a first dielectric insert (6) and an upwardly tapered inner surface (6.2) of said first dielectric insert (6) engages an upwardly tapered outer surface (4.7) of the probe element (4) located near the end of the mounting section (3) facing towards the vessel.

13. A sensor apparatus according to claim 11, further comprising a first metallic insert, wherein seals (14, 15, 16), are inserted near the end of the mounting section (3) facing towards the vessel
    between the mounting section (3) and the first metallic insert (7), and
    wherein said seal (14) between the mounting section (3) and the first metallic insert (7) forms a slidable seal.

14. The sensor apparatus according to claim 13, wherein the seals are O-rings.

15. The sensor apparatus of claim 13, wherein the seals are inserted between a first dielectric insert (6) and the first metallic insert (7).

16. The sensor apparatus of claim 13, wherein the seals are inserted between the probe element (4) and the first dielectric insert (6) surrounding it.

17. A sensor apparatus according to claim 1, wherein the electrical connector (5) is coupled to a contact pin element, said contact pin element being configured for affixation to the probe element (4).

18. A sensor apparatus according to claim 1, wherein the dielectric inserts (6, 9, 10, 11, 17) are made of at least one of thermoplastic, thermoset plastic, elastomer, ceramic, polyetherimid (PEI), polytetrafluoroethylene (PTFE), polyphenylsulfide (PPS), and polycarbonate.

19. The sensor apparatus according to claim 18, wherein the dielectric inserts are formed by gas filled cavities.

20. A sensor apparatus according to claim 1, wherein the dielectric inserts are clamped between a first and a second metallic insert (7, 11), said first metallic insert (7) being located near an end of the mounting section (3) facing toward the vessel and said second metallic insert (11) being located near an end of the mounting section (3) facing away from the vessel.

21. A sensor apparatus according to claim 1, wherein an upwardly tapered inner surface (3.5) of the mounting section (3) located at the end of the mounting section (3) facing towards the vessel engages an upwardly tapered outer surface (6.1) of a first dielectric insert (6) and an upwardly tapered inner surface (6.2) of said first dielectric insert (6) engages an upwardly tapered outer surface (4.7) of the probe element (4) located near the end of the mounting section (3) facing towards the vessel.

22. A sensor apparatus according to claim 1, further comprising a first metallic insert, wherein seals (14, 15, 16) are inserted near the end of the mounting section (3) facing towards the vessel between the mounting section (3) and the first metallic insert (7), and wherein said seal (14) between the mounting section (3) and the first metallic insert(7) forms a slidable seal.

23. The sensor apparatus according to claim 22, wherein the seals are O-rings.

24. The sensor apparatus according to claim 22, wherein the seals are inserted between a first dielectric insert (6) and the first metallic insert (7).

25. The sensor apparatus according to claim 22, wherein the seals are inserted between the probe element (4) and the first dielectric insert (6) surrounding it.

* * * * *